United States Patent
Dembowski

[11] 3,901,842
[45] Aug. 26, 1975

[54] DEWATERING OF POLY(VINYL CHLORIDE)

[75] Inventor: Ronald J. Dembowski, Calumet City, Ill.

[73] Assignee: Nalco Chemical Company, Oak Brook, Ill.

[22] Filed: Jan. 24, 1974

[21] Appl. No.: 436,228

[52] U.S. Cl. .............. 260/29.6 RW; 260/29.6 MM; 260/29.6 PT; 260/29.6 RB; 260/92.5 W; 260/92.5 A; 260/876 R; 260/884

[51] Int. Cl. ............................................. C08f 3/30

[58] Field of Search ............... 260/92.5 W, 92.5 A, 29.6 MM, 260/29.6 RW, 29.6 PT, 29.6 RB, 884, 876 R

[56] References Cited
UNITED STATES PATENTS

| | | | |
|---|---|---|---|
| 2,713,568 | 7/1955 | Fisher, Jr. et al. | 260/29.6 |
| 3,620,988 | 11/1971 | Cohen | 260/29.6 |
| 3,697,493 | 10/1972 | Meyer | 260/85.5 |
| 3,755,225 | 8/1973 | Pierce, Jr. et al. | 260/23 |
| 3,764,638 | 10/1973 | Hwa et al. | 260/29.6 |

Primary Examiner—Eugene C. Rzucidlo
Attorney, Agent, or Firm—John G. Premo; John S. Roberts

[57] ABSTRACT

In the manufacture of emulsion or dispersion type poly(vinyl chloride) (PVC) utilizing conventional peroxide initiators, the PVC dispersion produced from the polymerization reactor is concentrated by using a coagulant such as alum in a centrifuge to produce a cake. The present method then introduces a redispersant to liquefy the PVC cake and make it amenable to spray drying. The redispersant comprises an effective amount of a low molecular weight polyacrylate, such as preferably a hydrolyzed polyacrylonitrile having 20–30 percent amide groups and 70–80 percent carboxyl groups and having a molecular weight in the operable range of 800–100,000; in a preferred range of 800–60,000 and in a most preferred range of 5,000–60,000. The polyacrylate additive is utilized in an effective amount of at least 700 ppm based upon the PVC product and preferably in the range of at least 700 to 8,000 ppm. The importance of the redispersant additive is that in commercial practice it allows the elimination of a thin-film evaporator and substitution of a centrifuge step before the spray dryer with a consequent saving of heat and energy. PVC sheets made from dispersions produced herewith show greater heat stability and equivalent blush resistance than comparable sheets without a polyacrylate redispersant additive.

8 Claims, 1 Drawing Figure

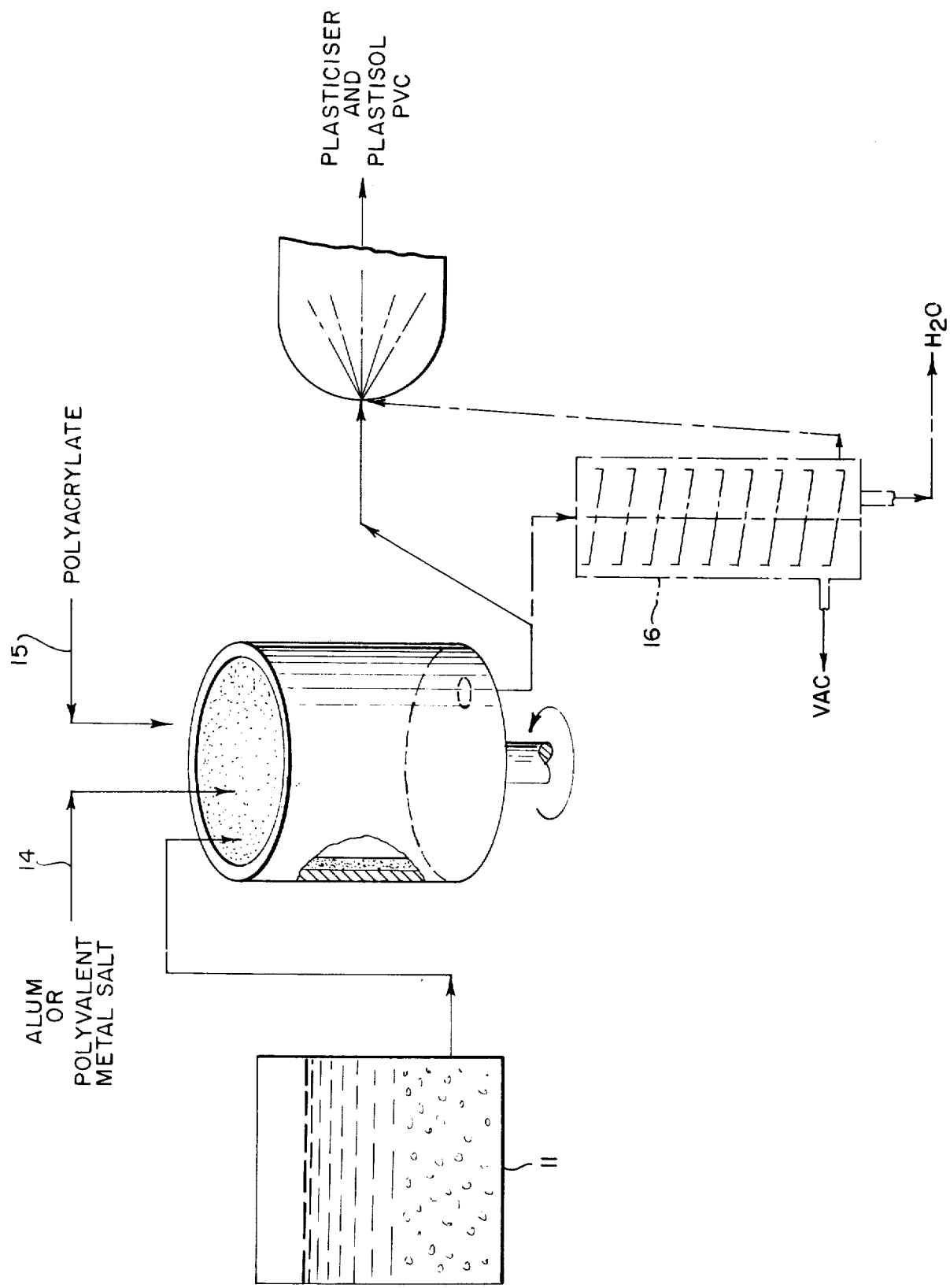

DEWATERING OF POLY(VINYL CHLORIDE)

The present invention deals with a step or improvement in the emulsion or dispersion type polymerization of vinyl chloride to poly(vinyl chloride). This type of aqueous emulsion polymerization was developed early in Germany between World War I and World War II (see Schildknecht, *Vinyl and Related Polymers*, 1952, John Wiley, page 395) and depends upon a charge of unpolymerized vinyl chloride with an emulsifying agent, such as sodium dioctyl sulfosuccinate or sodium dodecyl sulfate, and an initiator which may be a peroxide or an azo compound, such as potassium peroxy disulfate, or a redox catalyst consisting of a combination of a persulfate and bisulfite. The process is characterized by the production of polymer particles in the size range of 0.5–2 microns, usually averaging 1.5 microns. This size range is about 1/100 of the particles produced in a competing suspension polymerization. The emulsion process is designed to produce polymers which are susceptible to spray drying and form small uniform spheres which give plastisols on mixing with plasticizers. The products of this process are also known as paste-forming polymers.

In the commercial manufacture there has evolved a sequence of steps leading from a polymerization reactor to a thin-film evaporator, and finally to a spray dryer. All of the steps and apparatus after the reactor are designed to dewater the aqueous poly(vinyl chloride) which is produced in the reactor at about 25 percent solids and to increase the solids content to about 70% from the spray dryer.

The present process, by addition of a redispersant prior to the spray dryer and more particularly to an added centrifuge and especially to the centrifuge cake, in effect dewaters and liquefies the cake and enables the present process to bypass the thin-film evaporator and proceed directly to the spray dryer. Commercially, this is advantageous, since considerable heat is utilized in the thin-film evaporator and thus energy. Added chemicals to the centrifuge step are important; i.e., sufficient alum (aluminum sulfate) or an equivalent salt of a bivalent or trivalent metal is added to precipitate the original emulsifier which has been introduced with the PVC emulsion. This coagulating effect is then partially negated by the introduction of a redispersant or dewatering agent which, according to the present invention, is a low molecular weight polyacrylate, such as sodium polyacrylate in a molecular weight range of 800–100,000. Such an addition of polyvalent metal salts is described in U.S. Pat. No. 3,697,493 Meyer.

PRIOR PATENT ART

The prior patent art to which this invention relates is as follows:

U.S. Pat. No. 3,620,988 Cohen (B. F. Goodrich)

In suspension type polymerization of PVC to produce beads, the utilization in the polymerization reactor of a dispersing agent which may be a carboxyl type form or dual salt form of a cross-linked polyacrylic acid.

U.S. Pat. No. 3,697,493 Meyer (Dynamit Novel)
Cf. supra.

U.S. Pat. No. 3,755,225 Pierce et al (Diamond Shamrock)

In the emulsion polymerization of vinyl chloride, and after the polymerization reactor but prior to spray drying, the use of an additive which is an ethylene oxide adduct of ethylene glycol having a molecular weight ranging up to about 600.

U.S. Pat. No. 3,419,502 Newman (Nalco)

Dispersions of solids in aqueous systems such as paper making utilizing a hydrolyzed polyacrylonitrile polymer of low molecular weight; i.e., up to 40,000. The patent is devoted primarily to maintaining aqueous suspensions of solids.

As contrasted with the prior art above, this procedure redisperses or dewaters PVC by a centrifuge cake liquefying additive which consists of an effective amount of a low molecular weight polyacrylate, such as sodium or potassium polyacrylate, or preferably a hydrolyzed polyacrylonitrile having 20–30 percent amide groups and 70–80 percent carboxyl groups, all polyacrylates having a molecular weight in the operable range of 800–100,000; in a preferred range of 800–60,000; and in a most preferred range of 5,000–60,000. The molecular weight limitation is an upper limit of about 100,000 and the polyacrylate additive is utilized in an effective amount of at least 700 ppm based upon the PVC product and preferably utilized in the range of at least 700–8,000 ppm.

FIG. 1 is a schematic drawing of the present process with substitutions in phantom from a previous commercial process for the production of emulsion-type poly(vinyl chloride).

In this FIG. 1, 11 is a polymerization reactor, 12 is a centrifuge, 13 is a centrifuge cake, 14 shows introduction of alum or polyvalent metal salt, 15 shows introduction by arrow of polyacrylate redispersant, 16 is a phantom of thin-film evaporator made unnecessary by the present invention, 17 is a spray dryer, and 18 to plasticizer and plastisol.

ALUMINUM SULFATE (ALUM)

The function of the aluminum sulfate utilized in the coagulating stage is to neutralize the dispersants or emulsifying agents originally present in the reaction mixture and hence allow the emulsion to coagulate so that it can be centrifuged and there may be obtained a clear serum. As alternatives to aluminum sulfate, there may be utilized any of the variations of salts of bivalent or trivalent metals which can be used for precipitating emulsifiers and these include the chlorides, sulfates, nitrates, and acetates of calcium, magnesium, aluminum, stronium, barium, tin, or zinc. Commercially, the dosage for aluminum sulfate utilized in this process is from about 400–4,000 ppm.

POLYACRYLATE

Utilizable as a redispersant in the present process and also added to the centrifuge cake of the coagulating stage are alkali metal polyacrylates such as sodium and potassium polyacrylate as well as a polyacrylate which is a partially hydrolyzed polyacrylonitrile having a molecular weight of 800–100,000 and having 20–30 percent amide groups and from 70–80 percent carboxyl groups. The preferred molecular weight of this hydrolyzed polyacrylonitrile is from 800–60,000 with a most preferred of 5,000–60,000. The polyacrylate is added in a dosage of at least 700 ppm and in a range of at least 700–8,000 ppm.

The preferred polyacrylates as noted above are low molecular weight polymers of acrylic acid, $CH_2 = CHOOH$, within the molecular weight boundaries of from about 800–40,000. Operable polyacrylates include the free acid polymers as well as monovalent metal and ammonium salts which are generally soluble in water and such polar solvents as methanol, ethylene glycol, and dimethylformamide. Illustrative of compounds useable in the present invention are poly(acrylic acid), sodium polyacrylate, potassium polyacrylate, etc. The general preparation of these compounds is set out in Davidson and Sittig, *Water Soluble Resins*, 1962, Reinhold, in the chapter by F. J. Glavis entitled "Poly(Acrylic Acid) and Its Homologs," and also in the 2nd Edition, 1968. The polyacrylate additives act as dewatering agents as well as to liquefy the PVC cake present usually in the centrifuge step.

EXAMPLE 1

A poly(vinyl chloride) dispersion or emulsion was produced in a reactor using an emulsion procedure with sodium dioctyl sulfosuccinate. The product from the reaction vessel to a centrifuge was a 42 percent solids PVC dispersion which was then treated with 700 ppm of alum as a coagulant which removes the original emulsifiers from the mix. The coagulated dispersion was centrifuged for 3 minutes at 1500g's and then the centrifuge cake was treated with 700 ppm (based on PVC) of a low molecular weight polyacrylate. This polyacrylate was a hydrolyzed polyacrylonitrile containing 20–30 percent amide groups and 70–80 percent carboxyl groups and of an average molecular weight of about 40,000. A dispersion was produced which was fluid in nature and contained 69.6 percent solids with a viscosity of 1100 cps. This viscosity was sufficient to permit spray drying.

Additional runs were made with polyacrylates of different molecular weights but within the range 800–40,000 and similar advantageous results were obtained as to the redispersion and dewatering of the centrifuge cake.

EXAMPLE 2

The procedure of Example 1 was repeated utilizing (a) a polyphosphate base at 3 times the dosage level of Example 1 and (b) 3 separate high molecular weight acrylate polymers. As to the high molecular weight acrylate polymers (> MW 100,00) various dosage levels were utilized ranging from 100 ppm to 20,000 ppm, but there was no noticeable redispersant effect on centrifugation.

EXAMPLE 3

A dispersion of poly(vinyl chloride) produced by emulsion polymerization of monomeric vinyl chloride having an original solids content of about 42.2 percent was passed from the reactor to a centrifuge and broken up with 700 ppm of alum. The cake produced was then redispersed with 700 ppm of alum. The 700 ppm of alum coagulated the PVC dispersion and this coagulated slurry was then centrifuged for 5 minutes at 1500g's in the presence of various dosage levels of a low molecular weight polyacrylate. A dosage of 7140 ppm based on PVC was found to be optimum and dosage levels from 4,000–8,000 ppm and higher were found to be operable. This redispersion was carried out at low shear and was successfully passed to a spray dryer.

EXAMPLE 4

TABLE I

DISPERSION AND PLASTISOL PROPERTIES OF POLY(VINYL CHLORIDE)

| Sample | % Solids | Viscosity | Heat Stability 135°C | Heat Stability 150°C | Blush Resistance |
|---|---|---|---|---|---|
| Control | 42.2 | — | 15 min | 5 min | |
| A | 70.4 | — | 0 | 0 | >Control |
| B | 66.0 | — | 30 | 10 | <Control |
| Control | 42.2 | — | | 5 | |
| C | 69.0 | 1100 cps | | 10 | =Control |

A - centrifuged cake that was dried without redispersing.
B - a cake which was redispersed using a 6.5% solution of the Polymer of Example 1.
C - centrifuged cake that was redispersed using the polymer of Example 1 added neat.

Results: From the above data, the PVC redispersed with the hydrolyzed polyacrylonitrile polymer has better heat stability and the same blush resistance as the control. The measurement of heat stability was taken as the time required to produce noticeable yellowing at the temperatures noted.

EXAMPLE 4A

Preparation of Plastisols

Samples A, B, and C as well as the uncoagulated control sample noted in Table I were dried overnight at 52°C under vacuum. Supplemental mastication was effected by mortor and pestle to obtain a uniform powder. Then the plastisols were prepared by slowly adding 100 parts of PVC resin and 60 parts of dioctyl phthalate under high shear. Films were cast from the prepared plastisols by heating for 5 minutes at 155°C and these films prepared were then subjected to heat stability and blush resistance tests of the present invention wherein the temperatures of the heat stability tests were conducted at 135° and 150°C. The blush resistance tests were carried out by immersion of the films in water at room temperature for 1 hour.

We claim:

1. In the emulsion polymerization of vinyl chloride comprising (a) polymerizing monomeric vinyl chloride in the presence of an emulsifier to produce particles of poly(vinyl chloride) (PVC) ranging in size between 1–2 microns followed by (b) centrifuging in the presence of a polyvalent metal salt emulsifier coagulant to produce a cake and (c) subsequently spray drying to produce a final solids content of about 70 percent, the step which consists of adding to said cake at least 700 to 8,000 ppm of a polyacrylate based on the PVC polymer, said polyacrylate having a molecular weight of 800–100,000.

2. The process of claim 1 wherein the polyacrylate is a hydrolyzed polyacrylonitrile having 20–30 percent amide groups and from 70–80 percent carboxyl groups.

3. The process of claim 1 wherein the polyacrylate has a molecular weight of from 800 to 60,000.

4. The process of claim 1 wherein the polyacrylate has a molecular weight of from 5,000 to 60,000.

5. A method of dewatering poly(vinyl chloride) (PVC) prior to spray drying produced by the emulsion polymerization of vinyl chloride in a reactor which comprises centrifuging the poly(vinyl chloride) dispersion in the presence of a polyvalent metal salt coagulant and subsequently redispersing the formed cake by the addition of an effective amount of at least 700 ppm (based on the PVC polymer) of a low molecular weight polyacrylate having a molecular weight of 800–100,000.

6. The method of claim 5 wherein the polyacrylate is a hydrolyzed polyacrylonitrile having 20–30 percent amide groups and from 70–80 percent carboxyl groups.

7. The method of claim 5 wherein the polyacrylate has a molecular weight of from 800 to 60,000.

8. The method of claim 5 wherein the polyacrylate has a molecular weight of from 5,000 to 60,000.

* * * * *